United States Patent [19]

Su et al.

[11] Patent Number: 4,579,757
[45] Date of Patent: Apr. 1, 1986

[54] PLASTIC CONTAINERS FOR USE IN PACKAGING AND THERMAL PROCESSING OF COMESTIBLES

[75] Inventors: Cheh-Jen Su, Downers Grove; Boh C. Tsai, Rolling Meadows; James A. Wachtel, Buffalo Grove, all of Ill.

[73] Assignee: American Can Company, Greenwich, Conn.

[21] Appl. No.: 455,847

[22] Filed: Jan. 5, 1983

[51] Int. Cl.⁴ .................. B65D 11/16; B32B 27/08
[52] U.S. Cl. ............................. 428/35; 206/524.3; 206/524.6; 215/1 C; 426/106; 526/348; 526/351; 526/352
[58] Field of Search .............. 526/348, 351, 352; 428/35, 300; 426/106, 127; 206/524.1, 524.3, 524.6; 215/1 C

[56] References Cited

U.S. PATENT DOCUMENTS

| | | |
|---|---|---|
| 2,825,721 | 3/1958 | Hogan et al. ............... 526/351 |
| 2,918,461 | 12/1959 | Flynn ............................ 260/94.9 |
| 3,412,078 | 11/1968 | Hagemeyer, Jr. et al. ......... 526/125 |

FOREIGN PATENT DOCUMENTS 1284805  8/1972  United Kingdom .

OTHER PUBLICATIONS

Journal of Hygiene, Epidemiology, Microbiology and Immunology, vol. 13, pp. 254–263, 1969, by D. D. Braun, Moscow, USSR.

Primary Examiner—John E. Kittle
Attorney, Agent, or Firm—Paul R. Audet

[57] ABSTRACT

Off-flavor development is alleviated, or substantially minimized, in thermally processed comestibles packed in plastic containers. The container wall which is in contact with the comestibles is made of a polymer (e.g., polyethylene) containing low vinyl group concentration and low carbonyl group content after melt processing.

52 Claims, 2 Drawing Figures

PLASTIC CONTAINERS FOR USE IN PACKAGING AND THERMAL PROCESSING OF COMESTIBLES

FIELD OF INVENTION

This invention generally relates to plastic containers for use in packaging comestibles and is particularly related to minimizing off-flavors in the comestibles packaged in such containers.

In one aspect, the present invention relates to plastic containers wherein the container wall which is in contact with the comestibles is made of a polymeric material that does not cause off-flavors in the comestible when the container is thermally processed for sterilization.

In another aspect, this invention is concerned with the polymeric materials which are used to form the "contact wall" of plastic containers so as to minimize or substantially reduce off-flavors in the packaged foods.

BACKGROUND OF THE INVENTION

It is a matter of common knowledge that plastic containers are widely used for packaging some foodstuffs, medicinal and pharmaceutical products as well as a host of other items. It is also a matter of common knowledge that after the container is filled or packed with some comestibles, the container is sealed and thermally processed in order to sterilize its contents. Thermal processing of the plastic containers is carried out at elevated temperatures of as high as about 275° F. to ensure proper sterilization so that the comestibles will be safe for human consumption.

Several factors must be taken into consideration when forming a plastic container for packaging foods. These factors include resistance to oxygen permeation and, product migration, and structural integrity. Accordingly, plastic containers are frequently formed from multilayer laminates which include an intermediate oxygen barrier layer and inner and outer polyolefin structural layers. Adhesive layers may be used to bond the inner and outer layers to the barrier layer, and other layers may be optionally included, if desired. Where resistance to oxygen permeation is not essential, the plastic container may be made of a single layer of a suitable polymer such as polyethylene, a blend of polyethylene with polypropylene or a copolymer of ethylene with propylene.

A typical multilayer laminate used in making plastic containers comprises an intermediate oxygen barrier layer of ethylene-vinyl alcohol copolymers; an outer polyolefin layer, preferably polyethylene, polypropylene or a blend thereof, or a copolymer of ethylene with propylene; and an inner polyolefin layer similar to the outer layer. For this reason, this layer will hereinafter be sometimes referred to as the "contact layer", or when forming the inner wall of a container, as the "contact wall".

When the contact wall or contact layer of the plastic container is made of polyethylene, or a polymer or other material containing polyethylene, or ethylene copolymerized with another olefin (e.g., propylene); or if the container contact wall comprises any of the foregoing materials, after sterilization of the container, an off-flavor is often detected in the thermally processed comestibles. This off-flavor, which is variously characterized as "burnt smokey", "oxidized", or by some other appropriate designation by experienced members of a food taste panel, is often objectionable to consumers.

Accordingly, it is an object of this invention to substantially reduce the off-flavor taste of comestibles which have been thermally sterilized in plastic containers.

It is also an object of this invention to use plastic containers to package foods and other items wherein the container contact wall or contact layer does not impart off-flavor tastes to the container content during hot-filling or thermal sterilization, or wherein such off-flavor tastes are substantially reduced.

It is yet another object of this invention to form such plastic containers with contact wall made of a polymer which does not adversely affect the flavor of the packaged foods when the container is subjected to thermal processing.

The foregoing and other objects, features and advantages of this invention will become more evident from the ensuing detailed description of the invention.

DETAILED DESCRIPTION OF THE INVENTION

Figure 1:
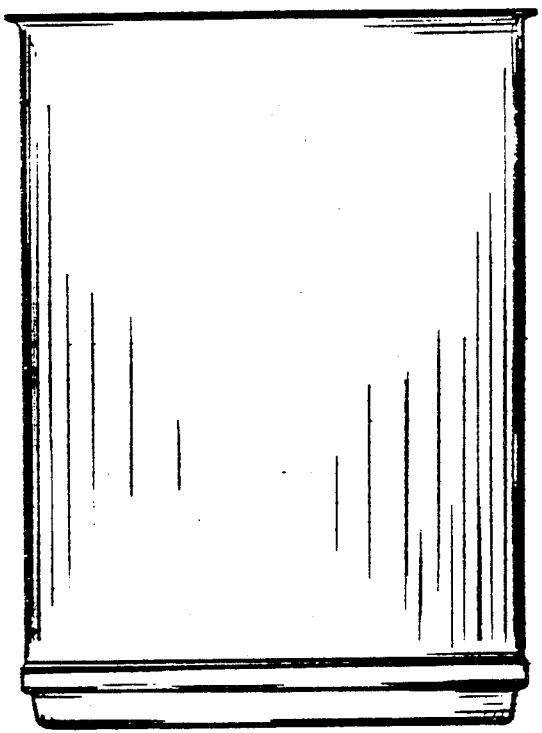
FIG. 1 in a front elevation view of a cylindrical plastic container made according to the process of this invention.
Figure 2:
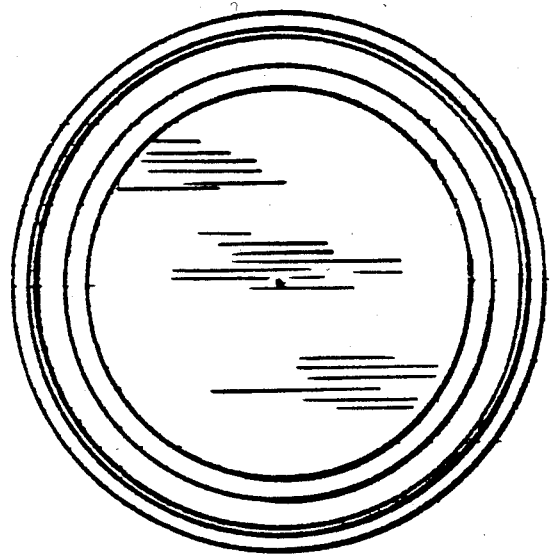
FIG. 2 is a bottom view taken along line 2—2 of FIG. 1.

In a commonly assigned copending application of Edwards, Wachtel, and Tsai, the latter two being two of the joint inventors of the present application, Ser. No. 455,846, filed Jan. 5, 1983, a method is disclosed for alleviating the off-flavor taste of comestibles which have been subjected to thermal sterilization in plastic containers. The method disclosed in that application comprises heat treatment of the resin used for making the container contact wall prior to forming the container in order to remove the precursors of the off-flavor producing substances. If the precursors are not removed, due to oxidation of these precursors or formation of other degradation products, the off-flavor producing substances in the container wall impart off-flavors to the comestibles during thermal sterilization It has now been found that another way of alleviating or substantially minimizing the off-flavor problem is by judicious selection of the polymer which forms the contact wall of the container, or the contact layer of the multilayer laminates used in forming the container.

It is generally recognized that the polymer composition or make-up and its properties can differ depending on such factors as the type of polymerization process (e.g., bulk, emulsion, suspension or solution), the polymerization conditions and, significantly, the type of catalyst which is sometimes used in the process. For example, it is known that polyethylene can be made by the polymerization of ethylene using different catalysts. Depending on the catalyst used, the properties of the resulting polyethylene will differ. For example, polyethylenes made by the so-called "Ziegler catalyst" generally contain lower amounts of unsaturation in the polymer chain.

In accordance with the present invention, it has been found that the degree of off-flavor which is imparted to the comestibles will vary with the nature of the polyethylene in the container contact wall. It has further been discovered that when the amount of unsaturation in the polyethylene is low (as will hereinafter be explained), the off-flavor development problems will be substantially minimized and the resulting thermally sterilized comestibles will have little or no objectionable taste. By contrast, when the amount of unsaturation in the polymer is high (as hereinafter explained), the resulting thermally sterilized comestibles will often have an objectionable taste.

The unsaturations present in polyethylene are primarily of the vinyl type. Such unsaturated groups are present in other polymers which contain polymerized ethylene segments, e.g., ethylene copolymers with other α-olefins or in blends of polyethylene with other polyolefins (e.g., polypropylene). This type of unsaturation will hereinafter be referred to as "vinyl unsaturation".

It has been discovered that when the polyethylene used in making the container contact wall has less than about 2.9 vinyl unsaturation groups per 2000 carbon atoms in the polymer chain, the off-flavor problem is minimized and the resulting taste of the comestibles is generally "acceptable" by a trained taste panel. Furthermore, the lesser the amount of vinyl unsaturation, the lesser the off-flavor, and the more acceptable the taste. In general, polyethylenes having about 0 to about 2.9 vinyl unsaturation groups per 2000 carbon atoms in the polymer chain, preferably those having less than about 2 vinyl unsaturation groups per 2000 carbon atoms in the polymer chain are recommended as the material of choice in forming the contact wall of the plastic container. Thus, polyethylenes having less than about 2.9 vinyl unsaturation groups per 2000 carbon atoms in the polymer chain will be characterized herein as polyethylenes with "low" vinyl unsaturation content and those having 2.9 or more vinyl unsaturation groups per 2000 carbon atoms in the polymer chain will be referred to as polyethylenes with "high" vinyl unsaturation content.

The relationship between the unsaturation content of various polyethylenes used to form the contact wall of plastic containers and off-flavor development in the comestibles packaged in such containers was determined in a series of tests according to the following procedures.

Several single layer plastic containers were formed by injection blow molding of different blends of 50-50 (weight ratio) polyethylene and polypropylene. The polypropylene used was the same in each blend, however, the polyethylene in each blend differed in density and melt index as follows:

| Blend | Density of Polyethylene in Blend, gm/cc[1] | Melt Index of Polyethylene in Blend, gms/10 min.[2] |
|---|---|---|
| A | 0.96 | 1.5 |
| B | 0.95 | 0.5 |
| C | 0.96 | 0.45 |
| D | 0.96 | 0.7 |
| E | 0.96 | 0.8 |
| F | 0.96 | 0.85 |

[1]Measured in accordance with ASTM D1505
[2]Measured in accordance with ASTM D1238

The polypropylene used in each blend had a density of 0.90 and a melt flow rate of 1.0 gms/10 min. measured in accordance with ASTM D1238.

The polyethylenes used to form the container wall varied in their vinyl unsaturation content as shown in Table I below. Testing was done in order to determine the effect of vinyl content of off-flavor development. All the initial vinyl contents reported are for the polyethylene portion of the blends. Thus, 40 grams of the container sidewall was immersed in 170 cc of distilled water at 212° F. for 60 minutes. Thereafter, 100 cc of the extract was added to 500 grams of pureed pears, placed in a refrigerator overnight, removed and brought up to room temperature, and tested for off-flavors development. This test was conducted by a panel of 5 members who are well-trained in the sensory evaluation of foods using the so-called Profile Analysis Method. A human Profile Panel is more sensitive to off-flavors and aromas than conventional analytical testing equipment. Table I summarizes the results of these tests.

TABLE I

| Container | Contact Wall | Initial Vinyl in PE Groups Per 2000 Carbon Atoms | Flavor Score[1] | Degradation Related Off-Notes |
|---|---|---|---|---|
| 1A | Blend A | 0.3 | 0 | None |
| 2A | Blend B | 0.1 | 0 | None |
| 3A | Blend C | 1.9 | 0 | None |
| 4 | Blend D | 2.9 | 1 | Smokey Plastic[2] |
| 5 | Blend E | 3.0 | 1 | Oxidized, burnt[2] |
| 6 | Blend F | 3.1 | 1 | Oxidized[2] |

[1]Flavor score is on a numerical scale of 0 to 3 as determined by a trained taste panel. A score of about ½ or less indicates an acceptable tasting product and a score of more than ½ indicates objectionable off-flavors development.
[2]Comments provided by at least some members of a trained taste panel relating to the taste of the product.

As shown in Table I, off-flavor development was noted in those products in which the polyethylene had a vinyl unsaturation content of 2.9 or more per 2000 carbon atoms in the polyethylene chain.

This is evident by the flavor score and the degradation related off-notes for each product.

In the next series of tests, the containers were made by injection blow molding of several multilayer laminates. These laminates consisted of an innermost layer (contact layer) of a blend of 50 parts by weight of polyethylene, 50 parts by weight of polypropylene, and 6 parts by weight of a color concentrate (mixture of titanium dioxide and polypropylene), an intermediate layer of ethylene-vinyl alcohol copolymer, an outermost layer of a similar blend of polyethylene and polypropylene, and adhesive layers for bonding the innermost and outermost layers to the ethylene-vinyl alcohol layer. All laminates had the same thickness and constitution except for the innermost and outermost layers which differed with respect to their polyethylene as follows:

| Blend | Density of Polyethylene In Blend, gm/cc | Melt Index of Polyethylene In Blend |
|---|---|---|
| G | 0.96 | 1.5 |
| H | 0.95 | 0.50 |
| I | 0.96 | 0.45 |

In these tests, pears which are originally packed in number 10 metal cans were removed, pureed and packaged in plastic containers made from the aforementioned multilayer laminates. The plastic containers were then thermally processed at 212° F. for 60 minutes and cooled, and the container contents were then evaluated for off-flavor development by the same panel which conducted the previous evaluation The results are shown in Table II below.

TABLE II

| Container | Container Contact Wall | Initial Vinyl Groups Per 2000 Carbon Atoms | Flavor Score | Degradation Related Off-Notes |
|---|---|---|---|---|
| 1B | Blend G[1] | 0.3 | 0½ | None |
| 2B | Blend H[2] | 0.1 | 0 | None |
| 3B | Blend I[3] | 1.9 | 0½ | Burnt, waxy (barely detectable) |

[1]Chemplex 5853/Exxon 5052PP
[2]American Hoechst GF7750M/Exxon 5052PP
[3]Alathon 7820/Exxon 5052PP. (Alathon is a registered trademark of E. I. du Pont de Nemours & Company (Inc.).)

As shown in Table II, the flavor is acceptable in the comestibles when the vinyl unsaturation content of the contact wall of the container is low, i.e., within the range prescribed herein.

Another criteria which should be considered in selecting the appropriate polymer for making the contact wall of the container is the carbonyl content of the polymer after melt processing. As in the case of vinyl unsaturation, the lower the carbonyl intensity of the melt processed polymer, the less objectionable is the taste of the comestibles in such containers.

In an accelerated test as described below, it was found that off-flavors were less objectionable at lower carbonyl contents. In one instance, however, the resulting taste was objectionable even at low carbonyl content. This is believed to be due to the presence of unusually large amounts of antioxidant in the polymer. Even though the antioxidant prevents formation of detectable levels of carbonyl groups in the accelerated test, they do not always prevent the development of off-flavors in the food.

The following accelerated test was conducted by melt processing the polymer at 475° F. because ordinarily the instruments used to determine the presence of carbonyl groups cannot detect the difference of these groups in the container at such low concentrations.

Approximately 50 to 60 grams of each polymer sample used in Table I was heated in a Brabender Mixer at 475° F. for 4 minutes. The heated polymer was then cooled and pressed in a platen press at 400° F. to form plaques 10–15 mil thick. The vinyl unsaturation and carbonyl intensity of the plaques were then determined using a Perkin Elmer IR580B, an infrared spectrometer, to measure the absorbances at 910 centimeter$^{-1}$ (for vinyl unsaturation) and at 1715 centimeter$^{-1}$ (for carbonyl intensity). Both absorbances were then normalized to correspond to a 10 mil thickness. Table III summarizes the results obtained using the different polymers having different initial vinyl unsaturation contents.

TABLE III

| Initial Vinyl Groups Per 2000 Carbon Atoms | Carbonyl Intensity Absorbance at 1715 cm$^{-1}$ | Flavor Score[1] | Degradation Related Off-Notes |
|---|---|---|---|
| 0.1 | 0.01 | 0 | None |
| 0.3 | 0.03 | 0 | None |
| 1.9 | 0.03 | 0 | None |
| 2.9 | 0.11 | 1 | Smokey plastic[2] |
| 3.0 | 0.19 | 1 | Oxidized burnt[2] |
| 3.1 | <0.01 | 1 | Oxidized[2] |

[1]Flavor score is on a numerical scale of 0 to 3 as determined by a trained taste panel. A score of about ½ or less indicates an acceptable tasting product and a score of more than ½ indicates objectionable off-flavors development.
[2]Comments provided by at least some members of a trained taste panel relating to the taste of the product.

The polypropylene used in making the blends described in this application was obtained from Exxon and is designated as polypropylene 5052, Lot No. 32252. When tested by the foregoing procedure, the initial vinyl content and carbonyl intensity and this polymer could not be detected.

As noted from Table III, with one exception as was previously discussed, the higher the vinyl unsaturation content of the polymer, the higher the carbonyl intensity, after melt processing. Thus, off-flavor development is best suppressed or minimized when the vinyl content is, as previously mentioned, from about 0 to about 2.9 per 2000 carbon atoms in the polymer chain. Additionally, as noted from Table III, the carbonyl intensity of the polymer after melt processing at 475° F. for 4 minutes should not exceed about 0.11, and preferably, it is from about 0 to about 0.11.

Still, another criteria which can be employed in selecting a suitable polymer as the container contact wall is the thermal stability of the polymer. The thermal stability was determined using a Perkin Elmer TGS-2 Thermal Gravimetric Analyzer (TGA). A 5–10 mg of the polmer sample was placed in the cell and the system was purged with air stream at 40 p.s.i.g. A Perkin Elmer System 4 Microprocessor Controller was used to program the sample heating rate of the sample at 30° C. per minute from 50° C. to 200° C. and at the rate of 10° C. per minute above 200° C. As the sample is heated, it will eventually reach a temperature at which it will decompose and begin to lose weight which is monitored by TGA. This temperature, i.e., the temperature of the onset of weight loss in the polymer is taken as a measure of thermal stability of the polymer. The higher the temperature, the more thermally stable is the polymer and the more acceptable is the taste of comestibles which are in contact with such polymer during thermal processing.

It has been found, for example, that when the container contact wall includes polyethylene having an onset temperature of 255° C. or lower, the resulting taste of the comestibles in the thermally processed container is objectionable, whereas polyethylene which exhibits onset of weight loss at temperatures higher than about 255° C. does not impart off-flavors to the thermally processed comestibles and the taste is acceptable to a trained taste panel. Those results are illustrated in Table IV below where the taste results are for the extraction type test cited in Table I.

TABLE IV

| Initial Vinyl Groups Per 2000 Carbon Atoms | Carbonyl Intensity Absorbance at 1715 cm$^{-1}$ | Degradation Onset Temp. °C. | Flavor Score[1] | Degradation Related Off-Notes |
|---|---|---|---|---|
| 0.1 | 0.01 | 263 | 0 | None |
| 0.3 | 0.03 | 266 | 0 | None |
| 1.9 | 0.03 | 264 | 0 | None |

TABLE IV-continued

| Initial Vinyl Groups Per 2000 Carbon Atoms | Carbonyl Intensity Absorbance at 1715 cm⁻¹ | Degradation Onset Temp. °C. | Flavor Score[1] | Degradation Related Off-Notes |
|---|---|---|---|---|
| 2.9 | 0.11 | 250 | 1 | Smokey plastic[2] |
| 3.0 | 0.19 | 254 | 1 | Oxidized, burnt[2] |
| 3.1 | <0.01 | 254 | 1 | Oxidized[2] |

[1]See footnote in Table I
[2]See footnote in Table I

It can be appreciated therefore that for each polymer, there is a temperature which corresponds to the onset of weight loss, which temperature should not be exceeded. In other words, the polymer should not be subjected to higher temperatures in order to avoid degradation or decomposition of the polymer which could adversely effect the taste of the packaged foods.

While the advantages of the present invention have been illustrated with blends of polyethylene and polypropylene, the container contact wall may be made entirely of polyethylene or it may be made of a copolymer of ethylene with propylene. It must be stated, however, that off-flavor development is primarily associated with the use of polyethylene or the copolymerized ethylene segment of the ethylene-propylene copolymer due to the presence of vinyl unsaturation therein, and carbonyl formation when the polymer is melt processed. Also, while the invention has been illustrated using blends of polyethylene and polypropylene having 50-50 weight ratios, the weight ratio of polyethylene to polypropylene can vary from about 3:2 to about 1:9.

If desired, the polymer used in making the contact wall of the container may be preheated as disclosed in the aforementioned copending application of with respect to which Tsai and Wachtel are common inventors and which disclosure is fully incorporated herein by reference.

What is claimed is:

1. A container for packaging and thermal processing of comestibles, said container having a comestible-contact wall formed of a polymer which does not impart an objectionable off-flavor in the nature of a burnt, smokey, oxidized or like objectionable off-flavor to comestibles thermally processed in the container, wherein said polymer is selected from the group consisting of polyethylene, blends of polyethylene with polypropylene and copolymers of ethylene with propylene, and wherein said polymer contains less than 2.9 vinyl unsaturation groups per 2000 carbon atoms in the polymerized ethylene segment of said polymer.

2. A container as in claim 1, wherein said polymer, after melt processing at 475° F. for 4 minutes, exhibits a carbonyl absorbance intensity of from about 0 to about 0.11, as measured by infrared spectrometer at 1715 centimeter⁻¹.

3. A container as in claim 1 wherein said polymer is thermally stable at the melt processing temperature of the polymer.

4. A container as in claim 2 wherein said polymer is thermallly stable at the melt processing temperature of the container.

5. A container as in claim 1, 2, 3 or 4 wherein said polymer is polyethylene.

6. A container as in claim 1, 2, 3 or 4 wherein said polymer is a blend of polyethylene with polypropylene.

7. A container as in claim 1, 2, 3 or 4 wherein said polymer is a copolymer of ethylene with propylene.

8. A container as in claim 6 wherein the weight ratio of polyethylene to polypropylene in said blend is from about 3:2 to about 1:9.

9. A container as in claim 1, 2, 3 or 4 wherein said polymer contains less than about 1.9 vinyl unsaturation groups per 2000 carbon atoms in the polymer chain.

10. A container as in claim 7, wherein said polymer contains less than about 1.9 vinyl unsaturation groups per 2000 carbon atoms in the polymer chain.

11. A container as in claim 8 wherein said polymer contains less than about 1.9 vinyl unsaturation groups per 2000 carbon atoms in the polymer chain.

12. A process for thermally sterilizing comestibles packaged in a plastic container whereby the development of off-flavor in the comestibles is substantially reduced, said process comprising filling the container with comestibles, sealing the filled container, and thermal processing the sealed container at a temperature and time sufficient to sterilize the comestibles, wherein said container is selected to have a wall adapted to be in contact with said comestibles and said wall is made of a polymer selected from the group consisting of polyethylene, blends of polyethylene and polypropylene and copolymers of ethlene with propylene, and wherein said polymer contains less than 2.9 vinyl groups per 2000 carbon atoms in the polymerized ethylene segment of the polymer.

13. A process for forming a plastic container having a wall adapted to be in contact with comestibles and which will permit thermal sterilization of the comestible in the container without developing significant off-flavors in the comestibles, which comprises:
selecting as the polymer which is to be used for the contact wall of the plastic container, a polymer selected from the group consisting of polyethylene, blends of polyethylene and polypropylene and copolymers of ethylene with propylene, and wherein further said polymer contains less than about 2.9 vinyl groups per 2000 carbon atoms in the polymerized ethylene segment of the polymer.

14. A container as in claim 13 wherein said polymer is thermally stable at the thermal processing temperature of the container.

15. A container as in claim 12, 13, or 14 wherein said polymer is polyethylene.

16. A container as in claim 12, 13, or 14 wherein said polymer is a blend of polyethylene with polypropylene.

17. A container as in claim 12, 13, or 14 wherein said polymer is a copolymer of ethylene with propylene.

18. A container as in claim 16 wherein the weight ratio of polyethylene to polypropylene is from about 3:2 to about 1:9.

19. A container as in claim 12, 13 or 14 wherein said polymer contains less than about 19 vinyl unsaturation groups per 2000 carbon atoms in the polymer chain.

20. A container as in claim 16, wherein said polymer contains less than about 1.9 vinyl unsaturation groups per 2000 carbon atoms in the polymer chain.

21. A container as in claim 17, wherein said polymer contains less than about 1.9 vinyl unsaturation groups per 2000 carbon atoms in the polymer chain.

22. A container as in claim 18, wherein said polymer contains less than about 1.9 vinyl unsaturation groups per 2000 carbon atoms in the polymer chain.

23. A container as in claim 19 wherein said polymer contains less than about 1.9 vinyl unsaturation groups per 2000 carbon atoms in the polymer chain.

24. A container for packaging and thermal processing of comestibles, said container having a comestible-contact wall formed of a polymer which does not impart an objectionable off-flavor in the nature of a burnt, smokey, oxidized or like objectionable off-flavor to comestibles thermally processed in the container, wherein said polymer is selected from the group consisting of polyethylene, blends of polyethylene with polypropylene and copolymers of ethylene with propylene, and wherein said polymer, after melt processing at 475° F. for 4 minutes, exhibits a carbonyl absorbance intensity of from about 0 to about 0.11, as measured by infrared spectrometer at 1715 centimeter$^{-1}$.

25. A process for thermally sterilizing comestibles packaged in a plastic container whereby the development of off-flavor in the comestibles is substantially reduced, said process comprising filling the container with comestibles, sealing the filled container, and thermal processing the sealed container at a temperature and time sufficient to sterilize the comestibles, wherein said container is selected to have a wall adapted to be in contact with said comestibles and said wall is made of a polymer selected from the group consisting of polyethylene, blends of polyethylene and polypropylene and copolymers of ethylene with propylene, and wherein said polymer, after melt processing at 475° F. for 4 minutes, exhibits a carbonyl absorbance intensity of from about 0 to about 0.11, as measured by infrared spectrometer at 1715 centimeter$^{-1}$.

26. A container formed by the process of claim 24 or 25.

27. A container as in claim 5 wherein said polymer contains less than about 1.9 vinyl unsaturation groups per 2,000 carbon atoms in the polymer chain.

28. A container as in claim 6 wherein said polymer contains less than about 1.9 vinyl unsaturation groups per 2,000 carbon atoms in the polymer chain.

29. A container for packaging and thermal processing of comestibles, said container having a comestible-contact wall formed of a polymer which does not impart an objectionable off-flavor in the nature of a burnt, smokey, oxidized or like objectionable off-flavor to comestibles thermally processed in the container, wherein said polymer is selected from the group consisting of polyethylene, blends of polyethylene with polypropylene and copolymers of ethylene with propylene, and exhibits an onset weight loss at a temperature higher than about 255° C.

30. A container as in claim 29 wherein said polymer contains less than about 2.9 vinyl unsaturation groups per 2,000 carbon atoms in the polymerized ethylene segment of said polymer.

31. A container as in claim 29, wherein said polymer, after melt processing at 475° F. for 4 minutes, exhibits a carbonyl absorbance intensity of from about 0 to about 0.11, as measured by infrared spectrometer at 1715 centimeter$^{-1}$.

32. A container as in claim 30, wherein said polymer, after melt processing at 475° F. for 4 minutes, exhibits a carbonyl absorbance intensity of from about 0 to about 0.11, as measured by infrared spectrometer at 1715 centimeter$^{-1}$.

33. A container as in claim 29, 30, 31 or 32 wherein said polymer is polyethylene.

34. A container as in claim 29, 30, 31 or 32 wherein said polymer is a blend of polyethylene with polypropylene.

35. A container as in claim 29, 30, 31 or 32 wherein said polymer is a copolymer of ethylene with propylene.

36. A container as in claim 34 wherein the weight ratio of polyethylene to polypropylene in said blend is from about 3:2 to about 1:9.

37. A container as in claims 29, 30, 31 or 32 wherein said polymer contains less than about 1.9 vinyl unsaturation groups per 2,000 carbon atoms in the polymer chain.

38. A container as in claim 33 wherein said polymer contains less than about 1.9 vinyl unsaturation groups per 2,000 carbon atoms in the polymer chain.

39. A container as in claim 34 wherein said polymer contains less than about 1.9 vinyl unsaturation groups per 2,000 carbon atoms in the polymer chain.

40. A container as in claim 35 wherein said polymer contains less than about 1.9 vinyl unsaturation groups per 2,000 carbon atoms in the polymer chain.

41. A container as in claim 36 wherein said polymer contains less than about 1.9 vinyl unsaturation groups per 2,000 carbon atoms in the polymer chain.

42. The container of claim 5 wherein said container is rigid and formed of multiple layers.

43. The container of claim 6 wherein said container is rigid and formed of multiple layers.

44. The container of claim 9 wherein said container is rigid and formed of multiple layers.

45. The container of claim 10 wherein said container is rigid and formed of multiple layers.

46. The container of claim 24 wherein said container is rigid and formed of multiple layers.

47. The container of claim 29 wherein said container is rigid and formed of multiple layers.

48. The container of claim 33 wherein said container is rigid and formed of multiple layers.

49. The container of claim 34 wherein said container is rigid and formed of multiple layers.

50. The container of claim 37 wherein said container is rigid and formed of multiple layers.

51. The container of claim 38 wherein said container is rigid and formed of multiple layers.

52. The container of claim 39 wherein said container is rigid and formed of multiple layers.

* * * * *